United States Patent
Sakura et al.

(10) Patent No.: US 9,473,484 B2
(45) Date of Patent: *Oct. 18, 2016

(54) INTERNETWORK AUTHENTICATION

(71) Applicant: Aerohive Networks, Inc., Sunnyvale, CA (US)

(72) Inventors: Kenshin Sakura, San Francisco, CA (US); Matthew Stuart Gast, San Francisco, CA (US); Long Fu, Saratoga, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,251

(22) Filed: Aug. 6, 2015

(65) Prior Publication Data

US 2015/0350183 A1    Dec. 3, 2015

Related U.S. Application Data

(63) Continuation of application No. 14/014,247, filed on Aug. 29, 2013, now Pat. No. 9,143,498.

(60) Provisional application No. 61/695,282, filed on Aug. 30, 2012.

(51) Int. Cl.
H04L 29/06        (2006.01)

(52) U.S. Cl.
CPC .......... *H04L 63/08* (2013.01); *H04L 63/0884* (2013.01); *H04L 63/0892* (2013.01); *H04L 63/166* (2013.01); *H04L 63/20* (2013.01)

(58) Field of Classification Search
CPC . H04L 63/08; H04L 63/0884; H04L 63/166; H04L 63/0892; H04L 63/20
See application file for complete search history.

(56) References Cited

U.S. PATENT DOCUMENTS

| | | | | |
|---|---|---|---|---|
| 5,845,091 A | * | 12/1998 | Dunne | H04L 45/22 370/400 |
| 6,006,018 A | | 12/1999 | Burnett et al. | |
| 6,243,758 B1 | * | 6/2001 | Okanoue | H04L 12/185 370/389 |
| 6,847,609 B1 | * | 1/2005 | Sarnikowski | H04L 1/0803 370/229 |
| 6,976,087 B1 | | 12/2005 | Westfall et al. | |
| 7,032,022 B1 | * | 4/2006 | Shanumgam | H04L 41/0893 707/999.009 |
| 7,506,054 B1 | * | 3/2009 | Fuh | H04L 63/0227 709/225 |
| 7,774,828 B2 | | 8/2010 | Benenati et al. | |
| 8,064,583 B1 | | 11/2011 | Sutaria et al. | |
| 8,151,323 B2 | | 4/2012 | Harris et al. | |

(Continued)

OTHER PUBLICATIONS

Bolla et al., A Distributed Routing and Access Control Scheme for ATM Networks, May 1994, IEEE International Conference on Communications, vol. 1, pp. 44-50.*

(Continued)

*Primary Examiner* — Kenneth Chang
(74) *Attorney, Agent, or Firm* — Sheppard, Mullin, Richter & Hampton LLP

(57) ABSTRACT

A technique for network authentication interoperability involves initiating an authentication procedure on a first network, authenticating on a second network, and allowing access at the first network. The technique can include filtering access to a network, thereby restricting access to users with acceptable credentials. Offering a service that incorporates these techniques can enable incorporation of the techniques into an existing system with minimal impact to network configuration.

18 Claims, 6 Drawing Sheets

(56) References Cited

U.S. PATENT DOCUMENTS

| | | |
|---|---|---|
| 2002/0069117 A1 | 6/2002 | Carothers et al. |
| 2002/0099666 A1 | 7/2002 | Dryer et al. |
| 2002/0138632 A1 | 9/2002 | Bade et al. |
| 2003/0055818 A1 | 3/2003 | Faybishenko et al. |
| 2003/0061388 A1 | 3/2003 | Cleghorn et al. |
| 2004/0093340 A1* | 5/2004 | Edmondson ........... G09Q 10/10 |
| 2004/0100983 A1 | 5/2004 | Suzuki |
| 2004/0166874 A1 | 8/2004 | Asokan et al. |
| 2004/0196858 A1 | 10/2004 | Tsai et al. |
| 2005/0010692 A1 | 1/2005 | Jain et al. |
| 2005/0066200 A1 | 3/2005 | Bahl et al. |
| 2005/0138204 A1* | 6/2005 | Iyer ................... H04L 12/2641 709/242 |
| 2005/0141465 A1 | 6/2005 | Kato et al. |
| 2006/0037071 A1 | 2/2006 | Rao et al. |
| 2007/0208744 A1 | 9/2007 | Krishnaprasad et al. |
| 2008/0034401 A1* | 2/2008 | Wang .................... H04L 63/20 726/1 |
| 2008/0186896 A1 | 8/2008 | Fanfelle et al. |
| 2008/0307523 A1 | 12/2008 | Subramanyam et al. |
| 2009/0172789 A1 | 7/2009 | Band et al. |
| 2010/0024008 A1 | 1/2010 | Hopen et al. |
| 2010/0074418 A1 | 3/2010 | Poremba |
| 2010/0250735 A1 | 9/2010 | Andersen |
| 2011/0093434 A1 | 4/2011 | Arora et al. |
| 2011/0093919 A1 | 4/2011 | Naeslund et al. |
| 2011/0283104 A1 | 11/2011 | Sangubhatla |
| 2012/0226814 A1 | 9/2012 | Stucker |
| 2013/0007239 A1 | 1/2013 | Agarwal et al. |
| 2013/0185446 A1 | 7/2013 | Zeng et al. |
| 2014/0095525 A1 | 4/2014 | Hsiao et al. |
| 2015/0341765 A1 | 11/2015 | Macias et al. |
| 2016/0014025 A1 | 1/2016 | Wang |

OTHER PUBLICATIONS

Long, M. et al., "Localised Authentication for Inter-Network Roaming Across Wireless LANs," IEE Proceedings—Communications, vol. 151, No. 5, pp. 496-500, Oct. 24, 2004.

Seggelmann, R. et al., "Transport Layer Security (TLS) and Datagram Transport Layer Security (DTLS) Heartbeat Extension," Request for Comments (RFC) 6520, ISSN 2070-1721, Feb. 2012.

Winter, S. et al., "Transport Layer Security (TLS) Encryption for RADIUS," Request for Comments (RFC) 6614, ISSN 2070-1721, May 2012.

International Application No. PCT/US2013/057692, International Search Report and Written Opinion mailed May 1, 2014.

European Patent Application No. 13832735.8, Partial Search Report mailed Apr. 6, 2016.

European Patent Application No. 13832735.8, Search Report mailed Aug. 1, 2016.

* cited by examiner

INTERNETWORK AUTHENTICATION

CROSS-REFERENCE TO RELATED APPLICATIONS

This application is a continuation application of U.S. patent application Ser. No. 14/014,247, filed Aug. 29, 2013, entitled "INTERNETWORK AUTHENTICATION," which claims priority to U.S. Provisional Patent Application No. 61/695,282 filed Aug. 30, 2012, entitled "INTERNETWORK AUTHENTICATION," which is incorporated herein by reference.

BACKGROUND

An area of ongoing research and development is in improving access to networks, and in particular wireless networks. Wireless networks are frequently governed by 802.11 standards. While not all networks need to use all of the standards associated with 802.11, a discussion of the standards by name, such as 802.11n provides, at least partly because the standards are well-known and documented, a useful context in which to describe issues as they relate to wireless systems.

Companies often maintain private networks. Authentication typically ensures that employees and guests have the appropriate credentials for access to services on the network. Guest accounts are typically limited in service offerings and can be a burden to implement (typically borne by a receptionist), particularly when providing guest access on an individualized basis. Efforts to eliminate some of the burden of providing individual guest accounts have not solved trust issues, which are typically of non-trivial concern to private companies. From a technical perspective, joining an authentication federation requires some network infrastructure work. Specifically, setting up RADIUS servers, configuring firewalls for security, and creating a connection between the RADIUS servers at two companies.

The foregoing examples of the related art and limitations related therewith are intended to be illustrative and not exclusive. For Example, wireless clients may use different protocols other than 802.11, potentially including protocols that have not yet been developed. However, problems associated with performance may persist. Other limitations of the relevant art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

A technique for network authentication interoperability involves initiating an authentication procedure on a first network, authenticating on a second network, and allowing access at the first network. A system incorporating this technique can enable account holders of a first network to use a second network. In addition, account holders of the second network may be able to use the first network. Two subscribers to an authentication system can indicate that employees are to be mutually trusted. Employees of the first subscriber can use a network of the second subscriber and employees of the second subscriber can use a network of the first subscriber.

The technique can include filtering access to a network, thereby restricting access to users with acceptable credentials. Employees of a first subscriber may or may not be able to access a network of a second subscriber, depending upon the filtering rules at the second subscriber. A system incorporating the technique can be set up to accept requests only from certain peers. Offering a service that incorporates these techniques can enable incorporation of the techniques into an existing system with minimal impact to network configuration.

These and other advantages will become apparent to those skilled in the relevant art upon a reading of the following descriptions and a study of the several examples of the drawings.

DETAILED DESCRIPTION

Figure 1:
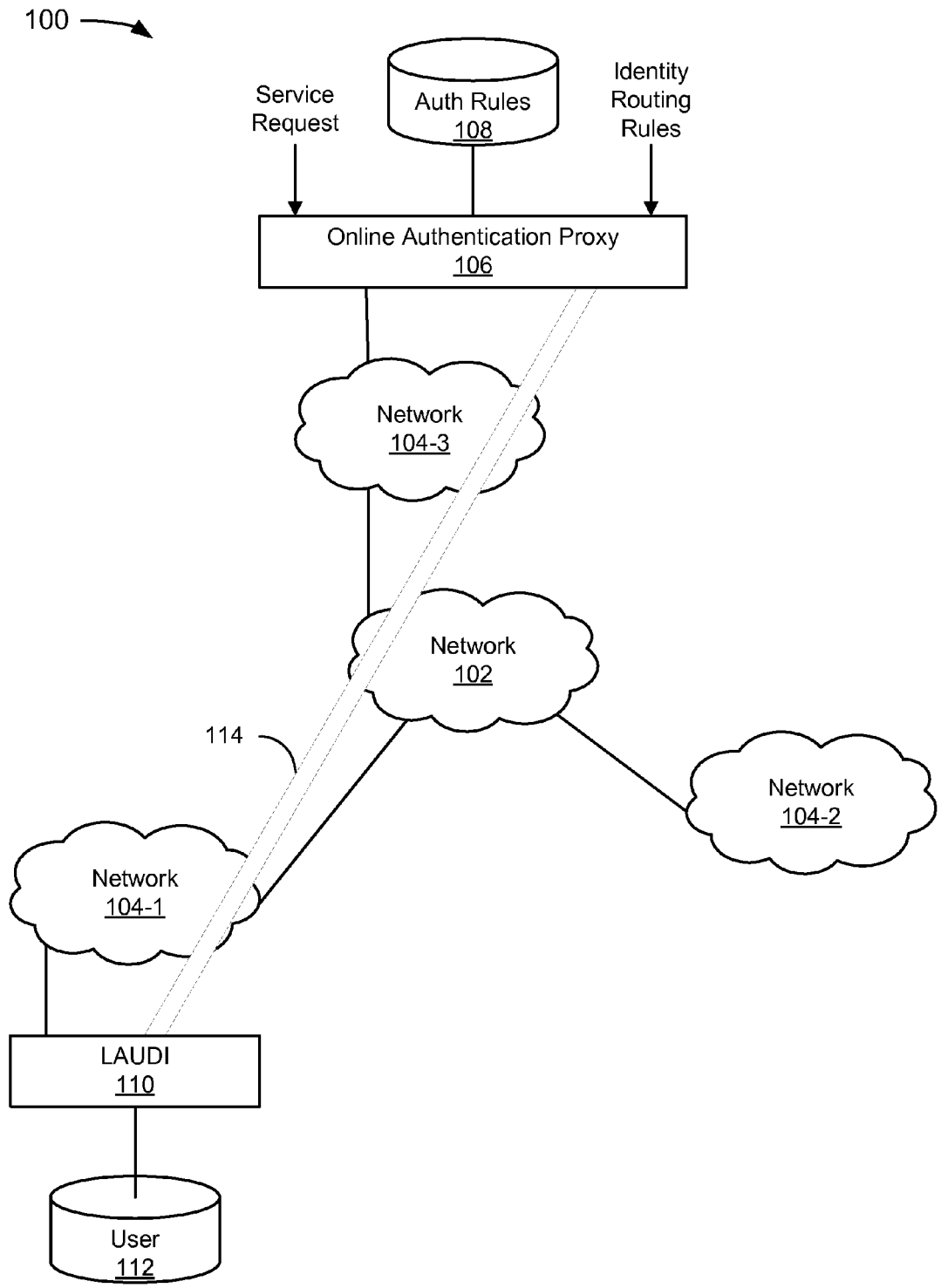
FIG. 1 depicts a diagram of an example of an internetwork authentication system.

FIG. 1 depicts a diagram 100 of an example of an internetwork authentication system. In the example of FIG. 1, the diagram 100 includes a network 102, networks 104-1 to 104-3 (collectively, the networks 104), an online authentication proxy 106, an authentication proxy rules datastore 108, a local authoritative user datastore interface (LAUDI) 110, and an authoritative user datastore 112.

In the example of FIG. 1, the network 102 may be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the networks 102 can include, for example, a wide area network (WAN), metropolitan area network (MAN), campus area network (CAN), or local area network (LAN), but the network 102 could at least theoretically be of any size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a network 102 that may or may not include more than one private network. In specific implementations, the network 102 can be implemented as a WAN, public switched telephone network (PSTN), cellular network, or some other network or combination of similar or different networks capable of coupling two private networks, such as the networks 104.

In a specific implementation, the network 104-1 includes a first LAN under the control of a first entity and the network 104-2 includes a second LAN under the control of a second entity. Techniques described in this paper may or may not be applicable to networks that are under the same administrative control. The network 104-3 is a network under the administrative control of an internetwork authentication service provider or an agent, partner, associate, or contractor thereof. Administrative control may or may not include ownership of hardware for an implementation that includes offering computing resources as a service. In a specific implementation, the network 104-3 includes a cloud network.

The networks 104 can include a wired network. The networks 104 may or may not also include a wireless network, such as a wireless LAN (WLAN). As used herein, a wireless network refers to any type of wireless network, including but not limited to a structured network or an ad hoc network. Data on a wireless network is often encrypted. However, data may also be sent in the clear, if desired. With encrypted data, a rogue device will have a difficult time learning any information (such as passwords, etc.) from clients before countermeasures are taken to deal with the rogue, assuming countermeasures are necessary.

In this paper, 802.11 standards terminology is used by way of relatively well-understood example to discuss implementations that include wireless techniques. For example, a station, as used in this paper, may be referred to as a device with a media access control (MAC) address and a physical layer (PHY) interface to a wireless medium that complies with the IEEE 802.11 standard. Thus, for example, stations and a WAP with which the stations associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's media access control (MAC) of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 1, the online authentication proxy 106 is coupled to the network 104-3. The online authentication proxy 106, and more generally any device connected to a network, can be referred to as "on" the network. For illustrative purposes, the online authentication proxy 106 is described in this example as a server. Accordingly, in this example, the online authentication proxy 106 can be referred to as a server, though it may or may not be appropriate to characterize the online authentication proxy 106 as a "proxy server." A web server, which is one type of server, is typically at least one computer system that operates as a server computer system, is configured to operate with the protocols of the World Wide Web, and is coupled to the Internet. Unless context dictates otherwise, a server as used in this paper includes at least a portion of a computer system running server software.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

In the example of FIG. 1, the authentication proxy rules datastore 108 is coupled to the online authentication proxy 106. A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In the example of FIG. 1, the LAUDI 110 is coupled to the network 104-1. In a specific implementation, the LAUDI 110 includes an authentication engine (not shown). As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. The network 104-2 may or may not include a LAUDI with the same or similar functionality as the LAUDI 110.

In the example of FIG. 1, the user datastore 112 is coupled to the LAUDI 110. An authentication engine (not shown) can use the user datastore 112 to determine whether a device is authorized on the network 104-1. The network 104-2 may or may not include a user datastore with the same or similar data structures as the user datastore 112. In some cases, such as after a station has been off-network authenticated, the network 104-2 may have a copy of the relevant data from the user datastore 112 to ensure the station can continue to have access to appropriate network resources even if a connection between the network 104-2 and one or both of the networks 104-1 and 104-3 is severed. Alternatively, the user datastore 112 could remain synched through a persistent connection. In a specific implementation, the network 104-3 can also have a user datastore used for on-network or off-network authentication at the network 104-3.

In the example of FIG. 1, in operation, the online authentication proxy receives a request for policy-based identity routing and filtering service for the network 104-1. The request can come from a device on the network 104-1 over the network 102 to the network 104-3, a device on the network 102 to the network 104-3, or a device on the network 104-3. In the first case, a person, such as a site administrator, business owner, or home owner, to name a few, can submit a request for a subscription via a web server or other online portal to the online authentication proxy 106. In the second case, a person acting on behalf of the network 104-1 could submit a request through a channel that is not necessarily associated with the network 104-1. In the third case, a potential customer could call or meet with an agent of the internetwork authentication service provider, or a facilitator thereof, and the agent can enter the service request into a device on the network 104-3.

In operation, the LAUDI 110 is implemented on a network device at the network 104-1. Networks with authentication typically include a user datastore, such as the user datastore 112. However, the interface to the user datastore is not authoritative for networks not under the administrative control of the entity controlling the network. In a specific implementation, the LAUDI 110 is implemented on an access point (AP). In other specific implementations, the LAUDI 110 is implemented on a wireless AP (WAP) or controller.

In the example of FIG. 1, in operation, the provider can make the LAUDI 110 available to the network 104-1, presumably to enable the network 104-1 to take advantage of the online authentication services. The LAUDI 110 can be provided as a software download for installation on a network device on the network 104-1, or a network device with the LAUDI 110 installed can be shipped to a recipient associated with the network 104-1 and coupled to the network 104-1 in due course. Other applicable convenient techniques for providing the LAUDI 110 to the network 104-1 can also be used. In a specific implementation, an authentication engine (not shown) is subsumed by the LAUDI 110. It may be noted that some or all of the authentication engine in the LAUDI 110 can be identical to some or all of the authentication engine that existed (or would have theoretically existed) prior to subsuming the authentication engine. Thus, advantageously, when the service is provided for the network 104-1, the authentication engine can be maintained in the same manner as it was prior, assuming the implementation and configuration of the system so allows.

As is illustrated in the example of FIG. 1, the LAUDI 110, when installed, is coupled to the user datastore 112. In a specific implementation, installing the LAUDI 110 does not change the user datastore 112. Thus, advantageously, when the service is provided for the network 104-1, the user datastore 112 can be maintained in the same manner as it was prior, assuming the implementation and configuration of the system so allows.

In the example of FIG. 1, in operation, the online authentication proxy 106 obtains a set of rules for identity routing to the first network. In a specific implementation, the set of rules is received via an administrative interface (not shown), input by someone such as an agent of the provider. Depending upon the capabilities of the system, the rules can also be input automatically, in accordance with known network-related characteristics. In a specific implementation, an agent of the network 104-1 provides rules for identity routing to enable a server, such as an online authentication proxy, to request authentication for a station through the LAUDI 110. The rules can filter based on credentials associated with a device, the source network, such as the network 102-2, from which the authentication request is coming, or on other bases that are available in a specific implementation of the internetwork authentication service, or configurations thereof. Advantageously, using techniques described in this paper, the routing can be more than simply identity routing, specifically identity routing and filtering.

In the example of FIG. 1, in operation, the online authentication proxy 106 establishes a connection 114 between the LAUDI 110 on the network device of the first network and the online authentication proxy 106. In a specific implementation, the connection 114 is persistent. More specifically, an outbound encrypted tunnel can be created and left in place, persistently, to avoid firewalls. Advantageously, a persistent connection can prevent firewalls and other perimeter security devices from interfering with the internetwork authorization service. For related reasons, organizations can sign up for the service and implement the authorization techniques without having to configure perimeter security devices. An outbound connection can also synch and hold an appropriate piece of a user datastore for off-network authenticated stations.

Advantageously, in operation, the network 104-2 can send an authentication request to the online authentication proxy 106, which can determine using the rules in the authentication proxy rules datastore 108 that the authentication request should be sent to the LAUDI 110 on the network 104-1. At the network 104-1, the LAUDI 110 can initiate an authentication procedure that includes accessing the user datastore 112 to compare credentials associated with the authentication request to entries in the user datastore 112. The LAUDI 110 can then provide an authentication result to the online authentication proxy 106, which the online authentication proxy 106 forwards to the network 104-2. In a specific implementation, a successful authentication result is indicative of a station (not shown) at the network 104-2 being allowed access to services on the network 104-2.

Due at least in part to the techniques employed, the online authentication proxy 106 can provide internetwork authentication service on computing resources delivered as a service via a third network (a subnetwork of the network 102). In a specific implementation, the online authentication proxy 106 is "in the cloud."

Figure 2:
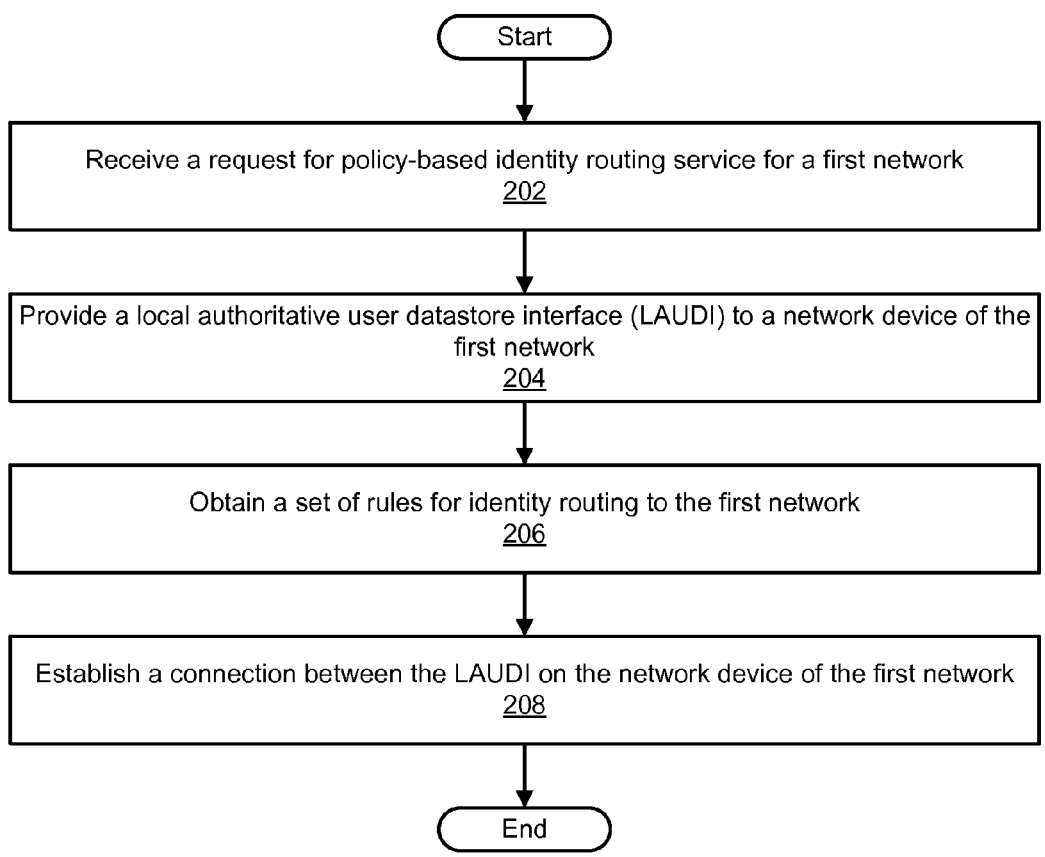
FIG. 2 depicts a flowchart of an example of a method for providing internetwork authentication services.

FIG. 2 depicts a flowchart 200 of an example of a method for providing internetwork authentication services. The flowchart 200 and other flowcharts described in this paper can be reordered or reorganized for parallel execution, if applicable. The flowchart 200 is intended to illustrate a method for providing internetwork authentication services using a system such as is illustrated by way of example in FIG. 1, but can be applicable to other systems, as well.

In the example of FIG. 2, the flowchart 200 starts at module 202 with receiving a request for policy-based identity routing services for a first network. The request can be from theoretically any party. However, a business model associated with providing the internetwork service may involve collecting payment for the service in the form of an initial payment and/or ongoing periodic or occasional payments. As such, the request can come from appropriately selected parties. Eventually, the provider of the internetwork service will receive an electronic request, whether from a party having appropriate credentials over a network interface or from an agent of the provider after having received a request from an appropriate party over the phone or through some other channel.

In the example of FIG. 2, the flowchart 200 continues to module 204 with providing a LAUDI to a network device of the first network. The LAUDI can be provided by way of a software download, or software provided on a drive or memory module, of a program that is ultimately installed or otherwise made available to the network device. The LAUDI can also be pre-installed on the network device or appliance and the network device shipped to an agent of, or implemented for, the first network. The network device can be implemented as a WAP or controller, as a stand-alone appliance, as a module in some other device, or in some other applicable manner. The LAUDI is coupled to a user datastore to enable the LAUDI to carry out authentication procedures. (At least conceptually, an authentication engine can be considered part of the LAUDI, even if the authentication engine was not provided, modified, or impacted in any way when providing and/or maintaining the LAUDI.)

In the example of FIG. 2, the flowchart 200 continues to module 206 with obtaining a set of rules for identity routing to the first network. The set of rules can be input via an administrative interface by an agent of the provider of the service or an agent of the first network. The rules establish conditions under which an authentication request is sent to the first network based upon credentials associated with the authentication request. For example, an authentication request associated with a domain or subdomain managed by the administrative entity of the first network may be appropriate for identity routing to the first network. Advantageously, the rules can include filtering rules that filter authentication request from specific networks, filter based upon specific identities, or other criteria. In a specific implementation that includes filtering and identity routing, the station credentials can include more characteristics, both explicit in an authentication request, derivable from the contents of an authentication request, based upon an intermediate source of the authentication request, or based on other applicable factors appropriate to assist in filtering authentication requests as desired, to the limits of the specific implementation or configurations thereof.

The filter can be configured to exclude no identities, to allow identities with corresponding credentials that could conceivably or are likely to be authenticated on the first network (e.g., by domain), to allow identities with credentials within a subset of those that could conceivably be authenticated on the first network (e.g., by subdomain, known group, or specific credentials), or to filter all identities. It may be noted that if all subscribers to an internetwork authentication service restrict access completely, there is not much point in the service, but it is possible for internetwork authentication service to be one-way, non-reciprocal, or unbalanced in some other way.

In the example of FIG. 2, the flowchart 200 ends at module 208 with establishing a connection between the LAUDI on the network device of the first network. In a specific implementation, the connection is persistent. Advantageously, a persistent connection can avoid problems with firewalls and peripheral security devices. After the flowchart 200 ends, internetwork authentication can in principle be characterized as "enabled" for the first network. If the first network is the first network to have enabled internetwork authentication, the first network will have no partners to take advantage of the internetwork authentication services. When a second network enables the internetwork authentication services, internetwork authentication becomes possible (though the two networks may still have to configure internetwork authentication service parameters to enable identity routing from one network to the other).

Figure 3:
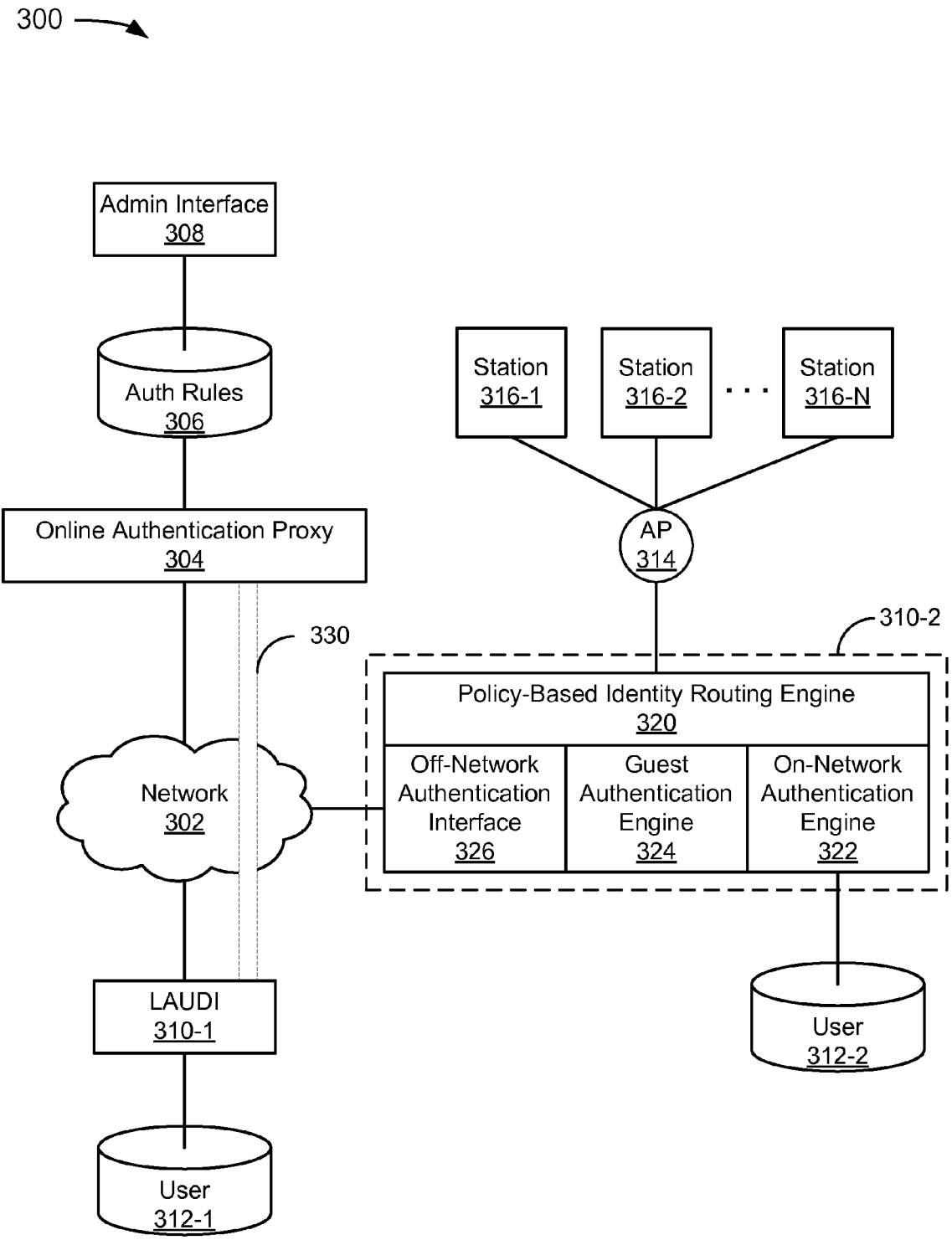
FIG. 3 depicts a diagram of an example of an internetwork authentication system.

FIG. 3 depicts a diagram 300 of an example of an internetwork authentication system. The diagram 300 includes a network 302, an online authentication proxy 304, an authentication proxy rules datastore 306, an administrative interface 308, LAUDIs 310-1 and 310-2 (collectively, the LAUDIs 310), user datastores 312-1 and 312-2 (collectively, the user datastores 312), an access point 314, and stations 316-1 to 316-N (collectively, the stations 316).

In the example of FIG. 3, the network 302 can include any number of networks. In a specific implementation, the network 302 includes four or more networks: The Internet (excluding the other three networks of this specific example for illustrative purposes); a first network, under the administrative control of a first entity, that includes the LAUDI 310-1 and the user datastore 312-1; a second network, under the administrative control of a second entity, that includes the LAUDI 310-2, the user datastore 312-2, the AP 314, and (to a variable degree ranging from "no administrative control" to "administrative control") the stations 316; and a third network, under the administrative control of an internetwork authentication service provider or facilitator thereof, on which the online authentication proxy 304, authentication proxy rules datastore 306, and the administrative interface 308, or portions thereof, are implemented. This specific implementation is an example; variations will likely exist.

In the example of FIG. 3, the online authentication proxy 304 is coupled to the network 302. The authentication proxy 304 can be implemented in a manner similar to the online authentication proxy 106 (FIG. 1).

In the example of FIG. 3, the authentication proxy rules datastore 306 is coupled to the authentication proxy 304. The authentication proxy rules datastore 306 can be implemented in a manner similar to the authentication proxy rules datastore 108 (FIG. 1).

In the example of FIG. 3, the administrative interface 308 is coupled to the authentication proxy rules 306. The administrative interface 308 can be implemented as a portal through which permitted parties can create, read, update, and delete (CRUD) in accordance with their permissions. The internetwork authentication service provider, or a facilitator thereof, may have CRUD rights, the internetwork authentication service provider, or a facilitator thereof, may not have CRUD rights, or the internetwork authentication service provider, or a facilitator thereof, can have CRUD rights that are limited in certain circumstance (e.g., the internetwork authentication service provider may be able to delete only, in the event a party opts to stop service, but at other times the party has full CRUD rights).

In the example of FIG. 3, the LAUDIs 310 are coupled to the network 302. The LAUDIs 310 can be implemented in a manner similar to the LAUDI 110 (FIG. 1). The LAUDI 310-2 can be implemented with additional functionality described in the following paragraphs and the LAUDI 110 (FIG. 1) and/or the LAUDI 310-1 is not prohibited from including the same or similar functionality.

In the example of FIG. 3, the user datastores 312 are coupled to the LAUDIs 310. The user datastores 312 can be implemented in a manner similar to the user datastore 112 (FIG. 1). In a specific implementation, a subset of data from the user datastore 312-1 can be provided to the user datastore 312-2 to facilitate on-network authentication of off-network accounts. In another specific implementation, a subset of data from the user datastore 312-1 can be provided to the user datastore 312-2 temporarily following off-network authentication of a station while the station is on the local network to avoid service loss in the event a network failure causes the second network to lose communication with the first network and/or the online authentication proxy 304.

In the example of FIG. 3, the AP 314 is coupled to the LAUDI 310-2. In a specific implementation, the LAUDI is implemented on an AP, in which case the AP 314 is part of the same monolithic device that includes, at least in part, both the AP 314 and the LAUDI 310-2. In a specific implementation, the AP 314 includes a WAP.

In the example of FIG. 3, the stations 316 are coupled to the AP 314. It may be noted that, particularly in a wireless context, the stations 316 can include stations that have not authenticated with the AP 314. As such, the stations 316 can be thought of as devices within a basic service set (BSS), extended service set (ESS), or wireless access area of the AP 314, but not necessarily wirelessly connected to the wireless network. While stations could include rogue devices, a discussion of rogue devices is not critical to an understanding of the techniques described in this paper. Accordingly, the stations 316 are defined as stations that are either receiving network services or are attempting to authenticate for the purpose of describing the system, illustrated in the example of FIG. 3, in operation.

Referring once again to the LAUDI 310-2, in the example of FIG. 3, the LAUDI 310-2 includes a policy-based identity routing engine 320, an on-network authentication engine 322, a guest authentication engine 324, and an off-network authentication engine 326. The policy-based identity routing engine 320 is configured to route authentication requests from the stations 316 to an appropriate authentication engine. The routing determination is configuration-specific, but for the purposes of this example, includes at least the ability to identify credentials that cannot be authenticated locally and to route any associated authentication requests to the off-network authentication interface 326 when such credentials are identified.

The on-network authentication engine 322 accesses the user datastore 312-2 to determine whether the stations 316 are entitled to receive network services. The on-network authentication engine 322 can be treated as a "conventional" authentication engine on top of which the policy-based identity routing engine 320 sits. In a specific implementation, the on-network authentication engine 322 is implemented in a known or convenient fashion. However, the on-line network authentication engine 322 only receives authentication requests from the stations 316 that meet the requirements of the policy-based identity routing engine 320, which is a subset of all authentication requests.

The guest authentication engine 324 can be implemented to allow guest access regardless of credentials or to restrict access for the subset of the stations 316 that has credentials that fit the profile of neither off-network authentication nor on-network authentication. Alternatively or in addition, guest authentication can also be handled by the on-network authentication engine 322. Advantageously, the policy-based identity routing engine 320 can provide filtering to determine whether special treatment of guests is appropriate.

The off-network authentication interface 326 is configured to forward authentication requests that meet the profile of off-network authenticatable stations. A successful authentication response is indicative of a station being entitled to have access to network services through the AP 314. Depending upon the implementation, the user datastore 312-2 can be updated to include data associated with each of the authenticated stations 316, regardless of whether the stations were authenticated locally or remotely. In a specific implementation, different ones of the stations 316 have access to different services based upon the credentials of the stations 316, and the services may or may not be different for off-network authenticated and on-network authenticated stations 316.

In the example of FIG. 3, a connection 330 is illustrated between the LAUDI 310-1 and the online authentication proxy 304. A similar connection may or may not exist between the LAUDI 310-2 and the online authentication proxy 304. For example, authentication requests could be sent via a channel that does not require a connection between the LAUDI 310-2 and the online authentication proxy 304. In a specific implementation, the connection 330 is persistent (and the connection between the LAUDI 310-2, if one exists, may or may not also be persistent).

In the example of FIG. 3, in operation, one of the AP 314 (or an upstream component) and one of the stations 316 engage in a transaction that causes the one of the stations 316 to send an authentication request to the AP 314. The authentication request can be generated in accordance with an applicable convenient protocol, such as 802.11. The AP 314 provides the authentication request to the LAUDI 310-2, which can entail sending or forwarding the authentication request if the AP 314 and the LAUDI 310-2 are not co-located.

In the example of FIG. 3, in operation, the policy-based identity routing engine 320 determines whether the authentication request has characteristics that match a filtering or identity routing rule indicative of the need for off-network authentication. The policy-based identity routing engine 320 can also determine whether the authentication request has characteristics that match a filtering or identity routing rule indicative of the availability of on-network authentication. Depending upon the implementation, one or the other of the determinations can be a default determination. For example, the policy-based identity routing engine 320 can determine whether the authentication request has characteristics that match a filtering or identity routing rule indicative of the need for off-network authentication, and if the authentication request does not have the requisite characteristics, the policy-based identity routing engine 320 can resolve the authentication request with on-network authentication. Optionally, the policy-based identity routing engine 320 can include the ability to identify guests or off-network authentication parameters for a different off-network authentication service that that provided in association with the online authentication proxy 304. Thus, the routing algorithm can enable three (or more) routing channels depending upon the specific implementation, or configurations thereof.

In the example of FIG. 3, in operation, if the policy-based identity routing engine 320 determines explicitly or by default that the authentication request meets the parameters of an authentication request suitable for initiating an on-network authentication process, the on-network authentication engine 322 accesses the user datastore 312-2 to generate an authentication response. If successful, the relevant one of the stations 316 is authenticated and given access to an applicable set of services in an applicable convenient manner.

In the example of FIG. 3, in operation, if the policy-based identity routing engine 320 determines that the authentication request meets parameters of an authentication request suitable for providing guest services, the guest authentication engine 324 generates a successful authentication response for the guest (or forwards the authentication request to an off-network authentication service and receives an authentication response thereto), and the guest is given access to an applicable set of services in an applicable convenient manner. It may be noted that guest access can be handled via the on-network authentication engine 322 in what would likely be considered a more conventional authentication process. Accordingly, the guest authentication engine 324 is not required for the purpose of handling guest authentications in some implementations.

In the example of FIG. 3, in operation, if the policy-based identity routing engine 320 determines explicitly or by default that the authentication request meets the parameters of an authentication request suitable for initiating an off-network authentication process, the authentication request is sent via the off-network authentication interface 326 to the online authentication proxy 304.

In the example of FIG. 3, in operation, although it is not necessary for the LAUDI 310-2 to have a persistent connection to the online authentication proxy 304, in a specific implementation a connection is established through the network 302 to the online authentication proxy 304 over which the LAUDI 310-2 sends the authentication request. In another specific implementation, the LAUDI 310-2 sends the authentication request via a persistent connection between the LAUDI 310-2 and the online authentication proxy 304.

In the example of FIG. 3, in operation, the online authentication proxy 304 consults the authentication proxy rules datastore 306 to determine whether the authentication request meets the parameters of an authentication request suitable for routing the authentication request to the LAUDI 310-1. The parameters can include credentials of the station for which authentication is requested, characteristics of the local network on which the authentication was initially requested, characteristics of the remote network on which the authentication process is carried out, or other factors that assist in meeting the desired objectives of subscribers to the internetwork authentication service. The authentication proxy rules datastore 306 may or may not include rules from the first network (the network being requested to perform the authentication) regarding the subset of credentials the first network is willing to authenticate remotely. The authentication proxy rules datastore 306 may or may not include rules from the second network (the requesting network), though such rules could at least in some implementations alternatively be implemented at the policy-based identity routing engine 320. The authentication proxy rules datastore 306 may or may not include rules from a party other than the first network and the second network regarding stations that are not permitted to authenticate using the internetwork service. In any of these cases, the rules may or may not have been input into the authentication proxy rules datastore 306 via the administrative interface 308.

In the example of FIG. 3, in operation, the online authentication proxy 304 sends the authentication request to the LAUDI 310-1 via the connection 330. In a specific implementation, the connection 330 is persistent, which avoids problems with peripheral security equipment, firewalls, and the like. (In a specific implementation, a subset of authentication requests received at the online authentication proxy 304 are filtered at the online authentication proxy 304, but unfiltered requests are the ones described here for narrative simplicity.)

In the example of FIG. 3, in operation, the LAUDI 310-1 initiates an authentication process in association with the authentication request. The LAUDI 310-1 may or may not treat the authentication request differently from local authentication requests.

In the example of FIG. 3, in operation, an authentication engine, which is at least conceptually part of the LAUDI 310-1, accesses the user datastore 312-1 and generates an appropriate authentication response. The LAUDI 310-1 sends the authentication response through the connection 330 to the online authentication proxy 304. In an alternative, the authentication response can be sent through a channel other than the connection 330. In yet another alternative, the LAUDI 310-1 could send the authentication response to the LAUDI 310-2, bypassing the online authentication proxy 304 on the return trip.

In the example of FIG. 3, in operation, the LAUDI 310-2 receives the authentication response and treats the requesting one of the stations 316 accordingly. For example, if the response is a failure, the station can be given access to some free services or none at all. As another example, if the response is a success, the station can be given access to services appropriate for an associated access profile.

Figure 4:
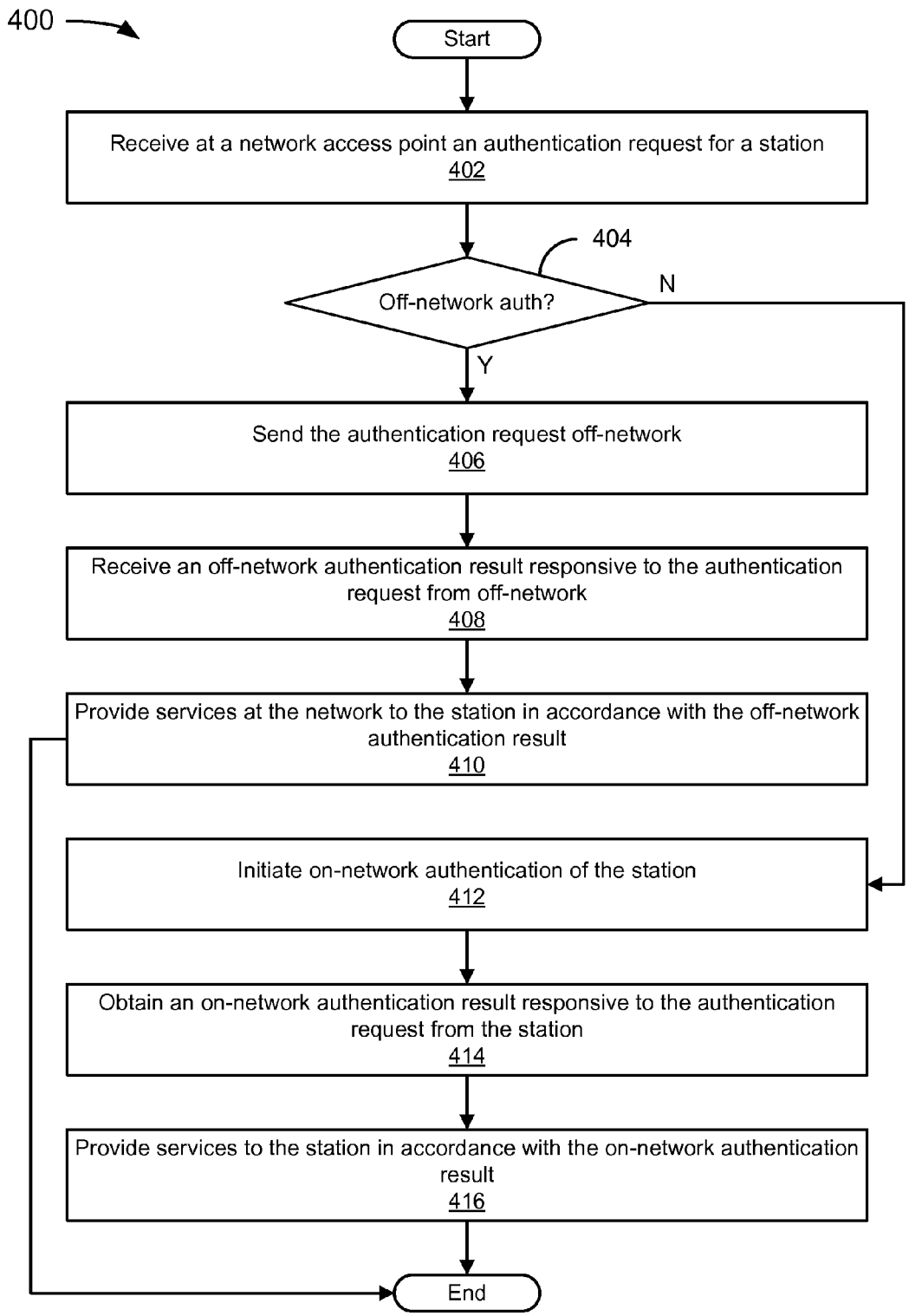
FIG. 4 depicts a flowchart of an example of a method of authenticating a station.

FIG. 4 depicts a flowchart 400 of an example of a method of authenticating a station. In the example of FIG. 4, the flowchart 400 starts at module 402 with receiving at a network access point an authentication request for a station. In a specific implementation, the network access point is a WAP. In a specific implementation, the authentication request is an applicable convenient format. For illustrative convenience, the authentication request is treated throughout this example as the same authentication request even if parameters or fields change as the authentication request is passed through various components of the system, so long as the authentication request remains an authentication request for the station.

In the example of FIG. 4, the flowchart 400 continues to decision point 404 where it is determined whether credentials of the authentication request make the authentication request appropriate for off-network authentication. The determination can take into consideration any applicable identifiable characteristics of the station (e.g., a domain).

If it is determined that the authentication request is appropriate for off-line authentication (404-Y), then the flowchart 400 continues to module 406 with sending the authentication request off network. In a specific implementation, the authentication request is sent to an authentication proxy, such as an online authentication proxy. Alternatively, the authentication request could be sent to a network capable of authenticating the authentication request remotely.

In the example of FIG. 4, the flowchart 400 continues to module 408 with receiving an off-network authentication result responsive to the authentication request from off network. In a specific implementation, the authorization request and the authentication response are sent over a connection that can be considered relatively secure, such as a persistent connection. In other implementations, particularly implementations with less secure connections, the authentication result can be subject to additional security checks. For the purposes of this example, an authentication result is considered successful if it is indicative of a successful off-network authentication and passes security check procedures, if any.

In the example of FIG. 4, the flowchart 400 ends at module 410 with providing services at the network to the station in accordance with the off-network authentication result. If the authentication result is "success," the station is granted access to appropriate services. If the authentication result is "failure," the station is granted access to free services or no services.

If, on the other hand, it is determined that the authentication request is not appropriate for off-line authentication (404-N), then the flowchart 400 instead continues to module 412, from decision point 404, with initiating on-network authentication of the station. The on-network authentication of the station may or may not be a "conventional" known or convenient authentication process.

In the example of FIG. 4, the flowchart 400 continues to module 414 with obtaining an on-network authentication result responsive to the authentication request from the station, and ends at module 416 with providing services to the station in accordance with the on-network authentication result.

Figure 5:
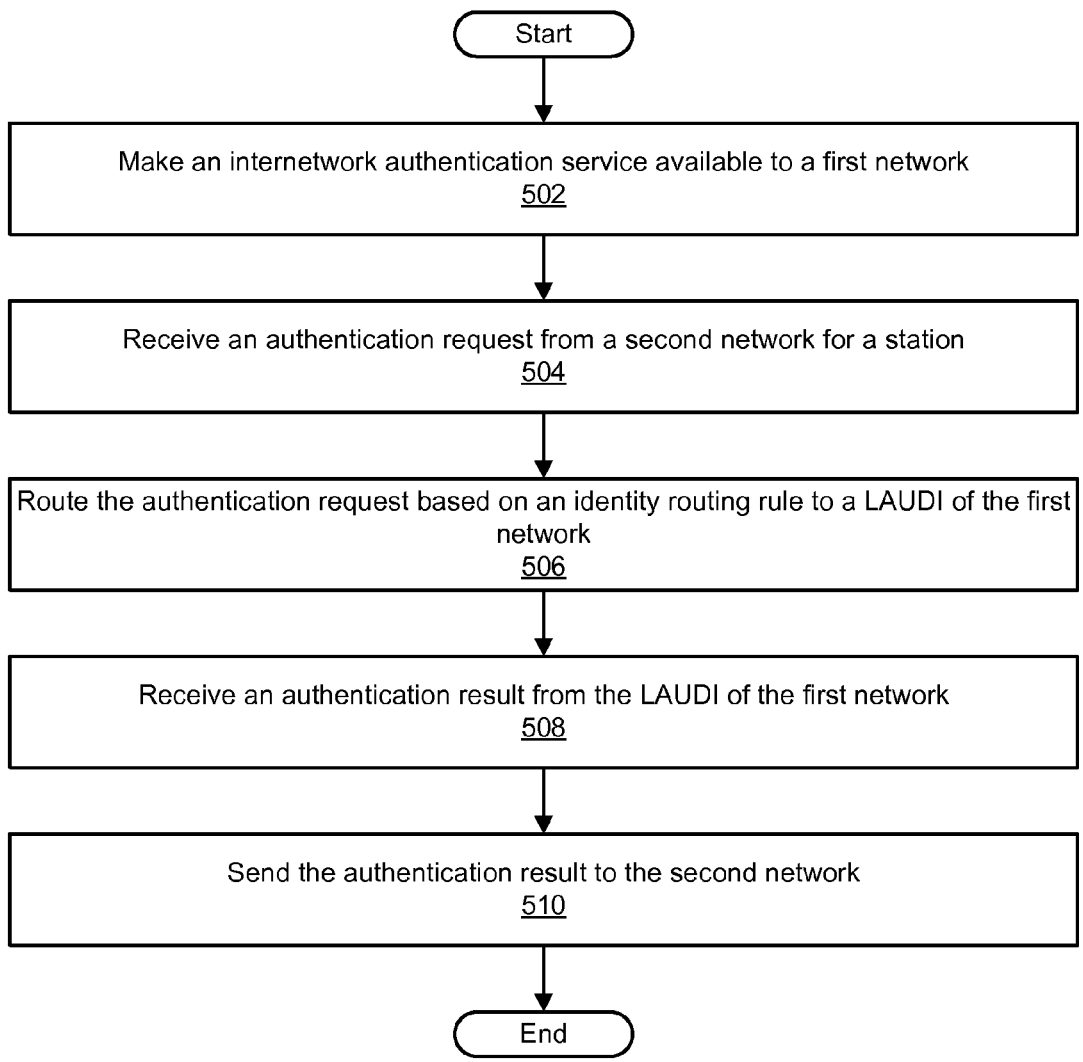
FIG. 5 depicts a flowchart of an example of a method of facilitating internetwork authentication.

FIG. 5 depicts a flowchart 500 of an example of a method of facilitating internetwork authentication. In the example of FIG. 5, the flowchart 500 starts at module 502 with making an internetwork authentication service available to a first network. Making an internetwork authentication service available can be accomplished as described by way of example with reference to FIG. 2, above, or in some other applicable manner.

In the example of FIG. 5, the flowchart 500 continues to module 504 with receiving an authentication request from a second network for a station. The second network may or may not be configured to remotely authenticate for other networks.

In the example of FIG. 5, the flowchart 500 continues to module 506 with routing the authentication request based on an identity routing rule to a LAUDI of the first network. In a specific implementation, the identity routing rule is a filtering and identity routing rule.

In the example of FIG. 5, the flowchart 500 continues to module 508 with receiving an authentication result from the LAUDI on the first network. In a specific implementation, the authentication request can be sent to and the authentication result received from the LAUDI over a persistent connection.

In the example of FIG. 5, the flowchart 500 ends at module 510 with sending the authentication result to the second network. The second network can then grant access to services based upon the authentication result in accordance with policy at the second network.

The following discussion is highly implementation specific, and is intended to provide by way of example details of the internetwork authentication proxy and network device discussed in the preceding paragraphs.

To implement features such as directory integration and cross-organization authentication proxy, a command channel can enable sending requests to network devices behind a firewall or utilizing some form of network address translation making it such that a cross-organizational authentication proxy would not normally be able to initiate connections to the network devices. Although it would be possible for a customer to change network policy to enable connections, it is not clear security-conscious network operators would allow such exceptions.

To solve this problem, persistent connections can be used. It is likely that at least one network device will have permission to make outbound connections, especially if they are made to common well-known ports such as TCP port 80 for HTTP. Once a network device opens one of these connections to an internetwork authentication proxy, it will leave the connection open and act as a server, waiting for authentication requests. Essentially, the client and server roles are reversed once the connection is established.

Useful characteristics of a command channel include firewall friendliness and secure transport and connection identification capabilities. It is desirable for this command channel to work without having to change firewall settings or network policy within a customer's network. The process and politics found in some IT departments can cause enough friction during deployment to ruin the user experience. Advantageously, the internetwork authentication service can work "out of the box." The command channel may need to traverse the public Internet. Because some applications of the internetwork authentication service involve transferring potentially sensitive data, the channel must provide confidentiality in certain implementations. If the internetwork authentication services provide for multi-tenancy, it is desirable for the command channel to associate each communication channel with a customer. In a specific implementation, the internetwork authentication proxy can verify the identity of the network device trying to establish a connection.

In a specific implementation, transport layer security (TLS) is enforced. TLS is a natural choice for establishing a secure connection between a network device and internetwork authentication proxy. A network device that has the ability to obtain a TLS client certificate identifying its owner can use the certificate to establish a mutually authenticated TLS session with an internetwork authentication proxy that has the capability. On the internetwork authentication proxy side, authentication gateways can generally accept TLS connections on, e.g., TCP ports 80 and 443. Because these ports are reserved for use by HTTP and HTTPS respectively, it is likely that connections to these ports will be allowed by most network security policies. Furthermore, the authentication gateways will most likely never run web services; so unorthodox use of these well-known ports will likely not interfere with anything.

When establishing the TLS session, each end must authenticate the other. The network device must be certain it is allowing requests from the true internetwork authentication proxy so that it can trust the incoming requests. The internetwork authentication proxy, as the TLS server, can perform client verification to obtain the network device's certificate. By verifying the certificate the internetwork authentication proxy can associate the proper customer account with the session being established. If either end cannot verify its peer, it may be desirable to abort the TLS session. It is risky from a security stand-point to let the TLS session continue to be built up if positive verification cannot be confirmed.

Because the communication channel is to be kept open indefinitely, the TLS handshake can negotiate the heartbeat protocol defined in RFC 6520, which is incorporated by reference, to warn either end if connectivity is lost. Both ends should be prepared to send and receive the heartbeat messages. If the network device detects that the TLS session is down, it can attempt to reestablish the connection if the customer has an active license for the feature. If the internetwork authentication proxy detects that the TLS session is down, it can stop using the channel for pending requests and try to find an alternate route. The internetwork authentication proxy may also terminate connections after necessary feature licenses expire.

In a specific implementation, once the TLS session is established, the network device and the internetwork authentication proxy agree on a purpose for the session. Each session should be dedicated to a single purpose defined by a higher-level application. Different applications should establish their own command channel connection. In a specific implementation, to establish purpose, the network device starts by sending the following four octet sequence:

1 octet—Major Version
1 octet—Minor Version
1 octet—Type
1 octet—Subtype

This sequence may remain constant through all future revisions of this protocol. If the internetwork authentication proxy understands and accepts the purpose, subsequent actions are defined by that particular purpose. Otherwise, the internetwork authentication proxy will terminate the TLS session. This signals to the network device that the purpose it proposed is not currently valid.

Optionally, the major version of the protocol is 1 and the minor version is 0. There is no hard requirement regarding when and how each of the version numbers change. The intent is to give a rough sense of the degree of change from one version to the next. For example, going from version 1.0 to 1.1 might imply minor changes that do not affect interoperability, whereas going from version 1.1 to 1.101 might imply substantial additions to the protocol. Ticking the major version should be construed as a major change in the protocol such that the previous version may not interoperate with the new one. Version numbers should generally be strictly increasing, but they need not be sequential.

The type field is intended to communicate the aforementioned purpose for the session to the internetwork authentication proxy. Based on this value, the internetwork authentication proxy can register the availability of the session to the appropriate application. Initially, the internetwork authentication proxy will support the following values for the type field:

0—Reserved
1—Authentication/Authorization
2—Data Synchronization
255—Testing

The type field is intended to communicate the aforementioned purpose for the session to the internetwork authentication proxy. Based on this value, the internetwork authentication proxy can register the availability of the session to the appropriate application. Initially, the internetwork authentication proxy will support the following values for the type field:

The Authentication/Authorization type is further divided into subtypes to indicate specific methods. Initially, the internetwork authentication proxy will use one subtype with value 0 for RADIUS. This subtype turns the session into a RadSec tunnel where the client and server roles are reversed. The network device should be prepared to receive and process RADIUS Access-Request messages once it indicates this purpose to the internetwork authentication proxy. The request format will follow RadSec, where a packet length is sent followed by that number of bytes representing the RADIUS message. Responses will be sent back to the internetwork authentication proxy in the same fashion. Where a RADIUS shared secret is required, the string "radsec" will be used as per RFC 6614, which is incorporated by reference. It is envisioned that additional subtypes can be introduced later to better leverage the access that network device has to a customer's directory service and internal network. Much of this additional functionality can probably be accomplished through creative uses of RADIUS, but allowing for different methods may offer more straightforward solutions.

The Data Synchronization type (value 2) will be used to distribute data to network devices such that it is available locally. The first use case will be caching credentials in the network device to allow authentication to succeed even when connectivity to the internetwork authentication proxy is lost. This use shall be designated subtype 0.

The Testing type (value 255) is reserved for testing the operation of the TLS processing in isolation of any particular application.

Some organizations deploy some form of directory service to store and manage user accounts. The internetwork authentication proxy would benefit from having access to these directory services. Such access would allow users from those organizations to authenticate using their home credentials at any location subscribed to the internetwork authentication service. However, it is unlikely that these organizations would allow connections to their directory from external entities beyond their control. These directories are typically only accessible from within an organization's private, internal network.

Although the internetwork authentication proxy cannot connect to private directories, network devices deployed in the same private network may have the capability to integrate with various directory services, which can bridge the gap between a directory service and the internetwork authentication proxy. By leveraging this capability, the internetwork authentication proxy can offer premium features built around a concept of allowing users to authenticate anywhere with the same password they use at their home organization.

In a specific implementation, the internetwork authentication proxy directory integration relies on directory integration capabilities in network devices, making it only available to customers who have deployed appropriate network devices. One use case is employee sponsorship of guests. This allows user accounts available in a customer's directory to have access to the internetwork authentication proxy web interface to create a guest account for somebody without creating a separate administrative account for each employee. The work to support employee sponsorship can include the ability to do basic proxy authentication, allowing users of one customer to authenticate against their home directory when visiting another internetwork authentication service customer. As the internetwork authentication service subscription base grows, this capability may become increasingly useful.

Employee sponsorship allows employees to authenticate and login to a simplified "Pretty" web application using their home directory credentials. When logging in, the internetwork authentication service, which can include local and remote components, determines whether it has a local account for the login name (and, if applicable, checks other parameters). If a local account is found, it is used to authenticate the user. If a local account is not found, then it examines, e.g., the domain portion of the login name to look for a customer that owns the domain and has the directory integration feature. If no customers match the domain, then the login fails. If the customer does match a directory, the internetwork authentication service can forward the authentication request there. Once logged in, the employee has the ability to create a guest account subject to the limit imposed by, e.g., an internetwork authentication service license.

Another use case, proxy authentication, occurs when a user from one internetwork authentication service customer organization visits another internetwork authentication service customer organization as a guest. If both customers have a directory integration license, the user will be able to authenticate with the same credentials he uses at his home organization.

As a multi-tenant system, an internetwork authentication system can create an illusion that each customer has an independent authentication server. Consequently, usernames are not necessarily globally unique. For example, the username alice@example.com can exist in multiple customer accounts, and each instance has no implied relationship with any of the others. It is as if each customer account is a unique realm.

Directory integration weakens this isolation by introducing the concept of domain ownership to the internetwork authentication system. Once a customer account has directory integration enabled, the customer must declare the domain names served by his directory. In a specific implementation, proxy authentication works among accounts that have directory integration enabled. For example, customers who do not purchase a directory integration license will function as they currently do, and will not be able to authenticate guests over the proxy network, even if the guest's organization is a an internetwork authentication service customer with directory integration enabled.

When a customer claims a domain, it is desirable for the internetwork authentication proxy to determine that the customer is the legitimate owner of that domain. In a specific implementation, domains must be unique; so, in this specific implementation, only one customer is associated with a domain at any given time. If different subdivisions of large organizations purchase the directory integration license independently, the first one to claim that organization's domain will be associated with it. Subsequent requests to claim that domain will be met with an error indicating that the domain is not available. Exceptions can be made as appropriate.

In a specific implementation, the internetwork authentication proxy can initiate requests to network devices that may be deployed behind corporate firewalls. Directory integration can use a TLS session initiated by a network device as the command channel over which requests will be sent. The command channel can terminate at an authentication gateway. After each command channel connection is established, the authentication gateway uses a customer ID from a client certificate to identify the source of the connection. The network device can use the same certificate that was issued to it for connecting to the internetwork authentication proxy's, e.g., RadSec server, if it has the customer ID encoded in it.

In a specific implementation, the authentication gateway runs a server on TCP ports 80 and 443 to process incoming command channel requests. It can also open a UDP port for incoming RADIUS requests from the internal network only. In a specific implementation, the only servers that have access to the UDP port are authentication servers. The authentication gateway does not necessarily process these RADIUS requests; the internetwork authentication proxy can forward them as-is over the command channel to a network device.

When each network command channel is created, the internetwork authentication proxy keeps a mapping of customer ID to authentication gateway. This mapping is used in a two-step lookup to find the correct authentication gateway to proxy requests to. If an authentication request cannot find a local account, it uses the domain portion of the username to find the customer ID. The customer ID then leads to the authentication gateway. When command channel connections are terminated, the corresponding mapping is deregistered. For now these mappings will be stored in an internetwork authentication proxy datastore for convenience. Should the mappings fall out of sync with reality, a periodic cleanup task could be run on the authentication gateways to fix stale data.

Some potentially valuable interfaces may include an interface to enable customers should be able to see their current license status and when it expires, an interface to set up domain ownership, an interface to set up domain whitelists and blacklists or filtering rules, an interface showing a user group to directory group mapping, and an interface for employee guest creation, to name several. Also, an operator interface could have an interface to mark domain ownership records as having been verified and to see some or all of a proxy "routing table." The actual verification may or may not be a manual process.

Advantageously, use of the techniques described in this paper can resulting in improved reporting. It can be better reported how many guest accounts exist/were used over a given time, how many guests are online and how much data they are using, where guests come from, and what devices guests use.

Figure 6:
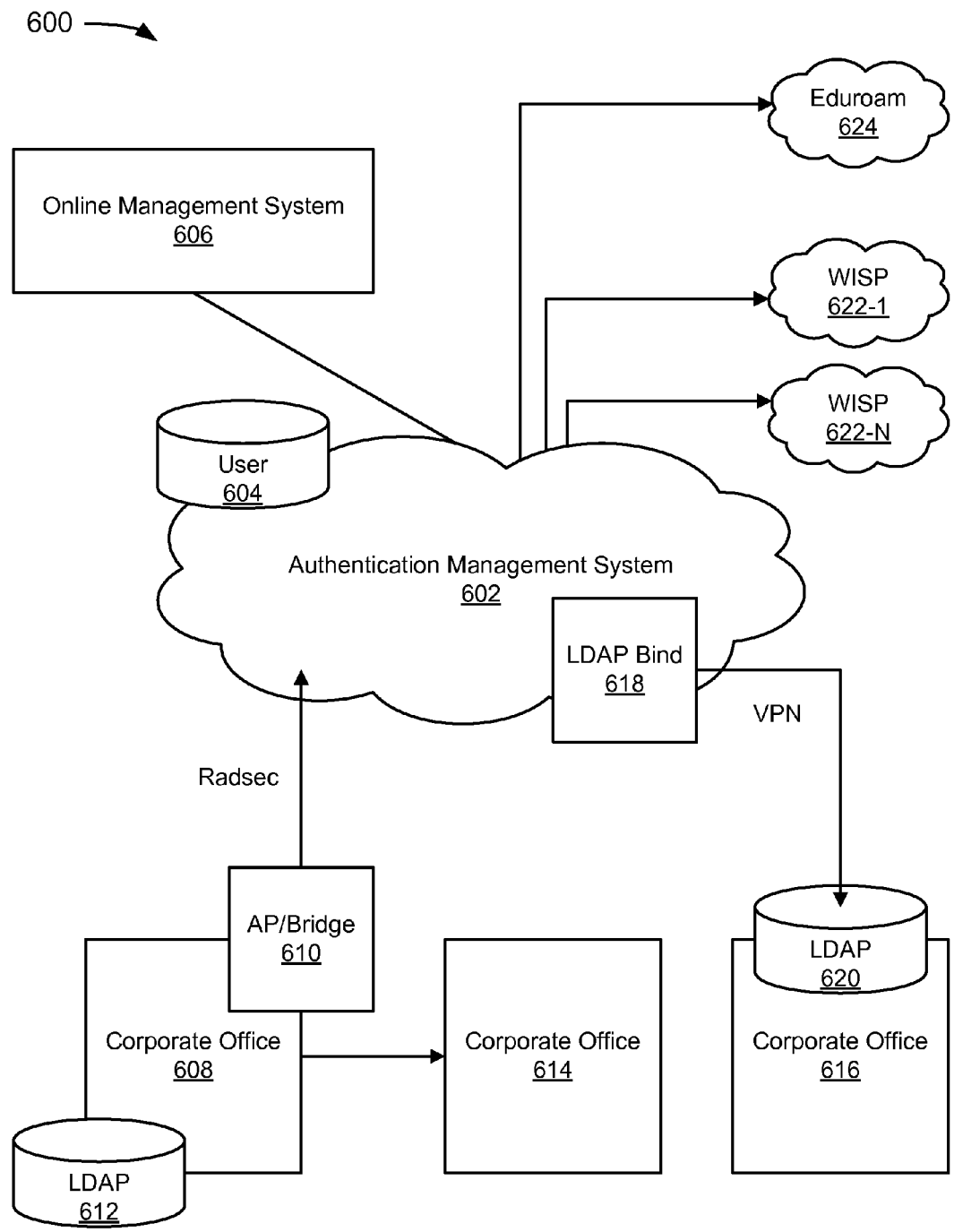
FIG. 6 depicts a diagram of an example of an internetwork authentication system including a cloud-based authentication management system (AMS).

FIG. 6 depicts a diagram 600 of an example of an internetwork authentication system including a cloud-based authentication management system (AMS). The diagram 600 includes a cloud-based AMS 602, a user datastore 604, an online authentication manager 606, a corporate office system 608, an AP/bridge 610, an LDAP datastore 612, a corporate office system 614, a corporate office system 616, an LDAP bind 618, a remote LDAP 620, hotspots 622-2 to 622-N (collectively, the hotspots 622), and an eduroam system 624.

In the example of FIG. 6, the cloud-based AMS 602 can include an authentication management system for a private network. By placing the AMS in the cloud, the AMS can be offered as a service.

In the example of FIG. 6, the user datastore 604 is coupled to the cloud-based AMS 602. The user datastore 604 can be implemented as a multi-tenant datastore with "slices" for each customer. In this example, the user datastore 604 is assumed to take advantage of cloud storage resources.

In the example of FIG. 6, the online management system 606 is coupled to the cloud-based AMS 602. An automatic set-up creates a bridge from the cloud-based AMS 602 to the online management system 606.

In the example of FIG. 6, the corporate office system 608 is coupled to the cloud-based AMS 602.

In the example of FIG. 6, the corporate office system 608 includes the AP/bridge 610. Radsec can use TCP for firewall and NAT compatibility. RADIUS can also be used, but may be less secure. In the example of FIG. 6, an arrow from the AP/Bridge 610 to the cloud-based AMS 602 is labeled Radsec to indicate that specific implementation. As such, in this example, authentication requests can be sent to the cloud over Radsec.

In the example of FIG. 6, the corporate office system 608 includes an LDAP datastore 612. The LDAP datastore 612 is treated as an active directory. The LDAP datastore 612 can receive requests for on-premises directory and authorizations for remote sites, such as another office at the same (first) company, corporate office system 614, or an office of a second company that recognizes guests from the first company, corporate office system 616. If the cloud-based AMS 602 binds 618 to a remote LDAP 620 over a VPN, it is possible to cache auth requests when the first company's WAN has failed.

In the example of FIG. 6, the cloud-based AMS is coupled to the hotspots 622. Companies can "export" a user datastore for use at the hotspots 622. Or can export a local user datastore to an eduroam system 624.

Advantages of a cloud-based authentication system include removing an appliance from a customer premises, reducing compatibility testing and troubleshooting of authentication systems with providers of both ends, and can facilitate relatively simple free samples to potential customers. As a first example, some organizations may not have significant IT expertise and an existing network may only be PSK with no domain controller or servers. Cloud service could provide single-sign on control for many services with a RADIUS front end—may need to proxy from bridge or AP to cloud service. As another example, users may arrive at a company building and need network access for demos or the like. The best point of contact is the front desk, never an IT person, which can be accomplished the techniques described in this paper. It is also possible to create bulk accounts with relative ease. As another example, many networks begin with a single shared PSK (and do not move to 802.1X because it is perceived to be too complex). Cloud-based service to manage PPSKs can increase security without significantly increasing manageability. As another example, not all companies have coordination between IT groups in different offices. Users go from site 1 to site 2, then need to find IT at site 2 to ensure network access, which is time-consuming and additional overhead for IT. With a single SSID between sites, a RADIUS proxy-type configuration could route requests without seeing user credentials, acting as "glue" in place of deficient IT planning. As another example, many organizations have mobile users. IT buys access for users to hotspot networks. Users find a hotspot network that IT has purchased access to, and sign on using their corporate credentials. VPN is automatically configured to corporate for secure end-to-end connectivity, billing records are handled automatically, and can be done with iPass or other roaming consortium, or even Skype. As another example, some networks may have visitors willing to pay for access, such as health care organizations (hospitals, skilled nursing facilities for long-term care) with family visitors. "Hot spot in a box" can be offered retail. You can create an SSID for public access and pass requests to the service provider. Skype can detect Skype-enabled hotspots and pay for access with Skype credit.

These and other examples provided in this paper are intended to illustrate but not necessarily to limit the described embodiments. As used herein, the term "embodiment" means an embodiment that serves to illustrate by way of example but not limitation. The techniques described in the preceding text and figures can be mixed and matched as circumstances demand to produce alternative embodiments.

We claim:

1. A method comprising:
   receiving a request for a policy-based identity routing service for a first network;
   providing a local authoritative user datastore interface (LAUDI) to a network device of the first network;
   obtaining a set of rules for identity routing to the first network;
   establishing a connection with the LAUDI on the network device of the first network;
   filtering authentication requests received from at least one other network, including a second network, to resolve the authentication requests with either on-network or off-network authentication;
   wherein a successful authentication result, from the LAUDI, for a station associated with the second network, is indicative of the station being allowed access to services on the second network including services provided by the first network and the set of rules for identity routing to the first network are used, at least in part, in providing the services on the second network.

2. The method of claim 1, wherein the LAUDI is provided to the network device of the first network through download.

3. The method of claim 1, wherein the LAUDI is preinstalled on the network device of the first network.

4. The method of claim 1, wherein the set of rules for identity routing to the first network are provided by an agent of the first network.

5. The method of claim 1, wherein the rules for identity routing to the first network include filter rules used in filtering the authentication requests received from the at least one other network, including the second network.

6. The method of claim 1, further comprising:
   receiving an authentication request from the second network for the station;
   routing the authentication request based on a rule of the set of rules to the LAUDI;
   receiving an authentication result from the LAUDI;
   sending the authentication result to the second network;
   wherein if the authentication result is the successful authentication result, then the station being allowed access to the services on the second network.

7. The method of claim 1, wherein the connection between the LAUDI and the network device is a persistent connection.

8. The method of claim 1, wherein the connection between the LAUDI and the network device is established using transport layer security.

9. The method of claim 1, further comprising obtaining a set of rules for filtering and identity routing to the first network, wherein the successful authentication result is indicative of station credentials sufficient to avoid filtering an authentication request associated with the station in accordance with the filtering rules and sufficient to permit routing the authentication request to the first network in accordance with the identity routing rules.

10. A system comprising:
    a local authoritative user datastore interface (LAUDI) provided to a network device of a first network;
    an online authentication proxy comprising a processor and memory storing instructions configured to:
    receive a request for a policy-based identity routing service for the first network;
    obtain a set of rules for identity routing to the first network;
    establish a connection with the LAUDI on the network device of the first network;
    filter authentication requests received from at least one other network, including a second network, to resolve the authentication requests with either on-network or off-network authentication;
    wherein a successful authentication result, from the LAUDI, for a station associated with the second network, is indicative of the station being allowed access to services on the second network including services provided by the first network and the set of rules for identity routing to the first network are used, at least in part, in providing the services on the second network.

11. The system of claim 10, wherein the LAUDI is provided to the network device of the first network through download.

12. The system of claim 10, wherein the LAUDI is preinstalled on the network device of the first network.

13. The system of claim 10, wherein the set of rules for identity routing to the first network are provided by an agent of the first network.

14. The system of claim 10, wherein the rules for identity routing to the first network include filter rules used in filtering the authentication requests received from the at least one other network, including the second network.

15. The system of claim 10, wherein the online authentication proxy is further configured to:
    receive an authentication request from the second network for the station;
    route the authentication request based on a rule of the set of rules to the LAUDI;
    receive an authentication result from the LAUDI;
    send the authentication result to the second network;
    wherein if the authentication result is the successful authentication result, then the station being allowed access to the services on the second network.

16. The system of claim 10, wherein the connection between the LAUDI and the network device is a persistent connection.

17. The system of claim 10, wherein the connection between the LAUDI and the network device is established using transport layer security.

18. The system of claim 10, wherein the online authentication proxy is further configured to obtain a set of rules for filtering and identity routing to the first network, wherein the successful authentication result is indicative of station credentials sufficient to avoid filtering an authentication request associated with the station in accordance with the filtering rules and sufficient to permit routing the authentication request to the first network in accordance with the identity routing rules.

* * * * *